(12) United States Patent
Bian et al.

(10) Patent No.: US 11,092,743 B2
(45) Date of Patent: Aug. 17, 2021

(54) WAVEGUIDE ABSORBERS

(71) Applicant: GLOBALFOUNDRIES U.S. INC., Santa Clara, CA (US)

(72) Inventors: Yusheng Bian, Ballston Lake, NY (US); Ajey Poovannummoottil Jacob, Watervliet, NY (US); Won Suk Lee, Malta, NY (US)

(73) Assignee: GLOBALFOUNDRIES U.S, INC., Santa Clara, CA (US)

( * ) Notice: Subject to any disclaimer, the term of this patent is extended or adjusted under 35 U.S.C. 154(b) by 0 days.

(21) Appl. No.: 16/749,363

(22) Filed: Jan. 22, 2020

(65) Prior Publication Data
US 2021/0223473 A1 Jul. 22, 2021

(51) Int. Cl.
G02B 6/122 (2006.01)
G02B 6/12 (2006.01)

(52) U.S. Cl.
CPC .. G02B 6/1228 (2013.01); *G02B 2006/12126* (2013.01)

(58) Field of Classification Search
CPC .................. G02B 6/1228; G02B 2006/12126
See application file for complete search history.

(56) References Cited

U.S. PATENT DOCUMENTS

| | | |
|---|---|---|
| 2,557,110 A | 6/1951 | Jaynes |
| 2,619,538 A | 11/1952 | Grant |
| 3,787,871 A | 1/1974 | Reese |
| 4,799,031 A | 1/1989 | Lang et al. |
| 7,002,429 B2 | 2/2006 | Asao et al. |
| 10,816,728 B1* | 10/2020 | Bian .................... G02B 6/1228 |
| 2016/0216446 A1* | 7/2016 | Kang ................... G02B 6/4291 |
| 2019/0334048 A1* | 10/2019 | Omelchenko ......... H01L 51/447 |

OTHER PUBLICATIONS

Bian et al., "Supplementary Information for: Hybrid vanadate waveguiding configuration for extreme optical confinement and efficient polarization management in the near-infrared", Aug. 2018, The Royal Society of Chemistry, p. 1-10. (Year: 2018).*
Giewont et al., "300-mm Monolithic Silicon Photonics Foundry Technology", IEEE, vol. 25, Issue 5, 2019, 11 pages.
Bian et al., "Hybrid vanadate waveguiding configurations for extreme optical confinement and efficient polarization management in the 'near-infrared'", The Royal Society of Chemistry, Nanoscale, Aug. 2018, 10 pages.
Dae Ho Jung et al., "Structural and electrical properties of transparent conductor SrVO3 thin films grown using radio frequency sputtering deposition", Journal of Vacuum Science & Technology A 37, 021507 (2019), 11 pages.

* cited by examiner

*Primary Examiner* — Sung H Pak
(74) *Attorney, Agent, or Firm* — Anthony Canale; Andrew M. Calderon; Roberts Calderon Safran & Cole, P.C.

(57) ABSTRACT

The present disclosure relates to semiconductor structures and, more particularly, to waveguide absorbers and methods of manufacture. A structure includes: a photonics component; and a vanadate waveguide absorber adjacent to the photonics component.

20 Claims, 7 Drawing Sheets

WAVEGUIDE ABSORBERS

FIELD OF THE INVENTION

The present disclosure relates to semiconductor structures and, more particularly, to waveguide absorbers and methods of manufacture.

BACKGROUND

Semiconductor optical waveguide structures (e.g., photonic components) are an important component of integrated optoelectronic systems. For example, a semiconductor optical waveguide structure is capable of guiding optical waves (e.g., light) with minimal loss of energy by restricting expansion of the light into the surrounding substrate. The optical waveguide structure can be used in many different applications including, e.g., semiconductor lasers, optical filters, switches, modulators, isolators, and photodetectors. The use of semiconductor material also enables monolithic integration into optoelectronic devices using known fabrication techniques.

Open or unconnected ports or other termination points of the photonics device can result in leakage or backscatter of the optical signal back into the chip. This can also cause crosstalk with other photonic devices, as well as overall interference of the optical signal. To prevent such issues from occurring, an absorber is coupled to the photonics device. The absorbers are known to be manufactured from Ge material as they are easily integrated into the fabrication processes of the photonics devices. However, Ge absorbers suffer from relatively high optical return loss (e.g., back-reflection and backscatter) which, in turn, can significantly impede the optical strength of the signal. Backscattering into lasers can result in instability and additional laser noise. Additionally, it can lead to degraded high-speed signal integrity and increased bit-error-rate of communication links.

SUMMARY

In an aspect of the disclosure, a structure comprises: a photonics component; and a vanadate waveguide absorber adjacent to the photonics component.

In an aspect of the disclosure, a structure comprises: a photonics component; and a waveguide absorber integrated with the photonics component, the waveguide absorber comprises a permittivity with a real part in a range of about negative twenty (−20) to about positive twenty (+20), and an imaginary part in a range of zero (0) to about fifteen (15).

In an aspect of the disclosure, a structure comprises: a waveguide structure composed of semiconductor material; a waveguide absorber coating the waveguide structure and integrated into a monolithic device with the waveguide structure, the waveguide absorber comprising $CaVO_3$ or $SrVO_3$; and an insulator material surrounding the waveguide structure and the waveguide absorber.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to waveguide absorbers and methods of manufacture. More specifically, in embodiments, the present disclosure is directed to vanadate based waveguide absorbers or other absorbers with similar material properties. Advantageously, the waveguide absorbers described herein offer simple and efficient ways to form waveguide structures, i.e., with attenuators, without introducing absorption material such as Ge, and while significantly reducing optical return loss. The waveguide structures can also be an ultra-compact design, and exhibit significantly reduce optical return loss while having an increased absorption coefficient (attenuation).

In embodiments, the waveguide structures described herein are ultra-compact monolithic structures composed of vanadate coated (covered) Si structures or vanadate coated SiN structures, as examples. In further examples, the waveguide structures can be based on other material systems, e.g., III-V, SiON, AlN, polymer, etc., coated with vanadate (or other materials with similar properties) to form integrated monolithic photonic waveguides and components. In further embodiments, the vanadate coating and waveguide structures can be provided in many different dimensions and/or shapes such as, e.g., a taper, hybrid taper with cascaded tapers and/or straight sections. By way of examples, the vanadate coating (e.g., waveguide absorber) can be a cascaded multi-stage taper integrated with straight or tapered waveguide structures or multiple tapers (e.g. segmented) integrated with straight or tapered waveguide structures, etc. The waveguide absorbers described herein can also be used for other functional photonics components (e.g., bends, couplers, etc.), and it easily integrated in a photonics integrated circuit.

The waveguide absorbers of the present disclosure can be manufactured in a number of ways using a number of different tools. In general, though, the methodologies and tools are used to form structures with dimensions in the micrometer and nanometer scale. The methodologies, i.e., technologies, employed to manufacture the waveguide absorbers of the present disclosure have been adopted from integrated circuit (IC) technology. For example, the structures are built on wafers and are realized in films of material patterned by photolithographic processes on the top of a wafer. In particular, the fabrication of the waveguide absorbers use three basic building blocks: (i) deposition of thin films of material on a substrate, (ii) applying a patterned mask on top of the films by photolithographic imaging, and (iii) etching the films selectively to the mask.

Figure 1A:
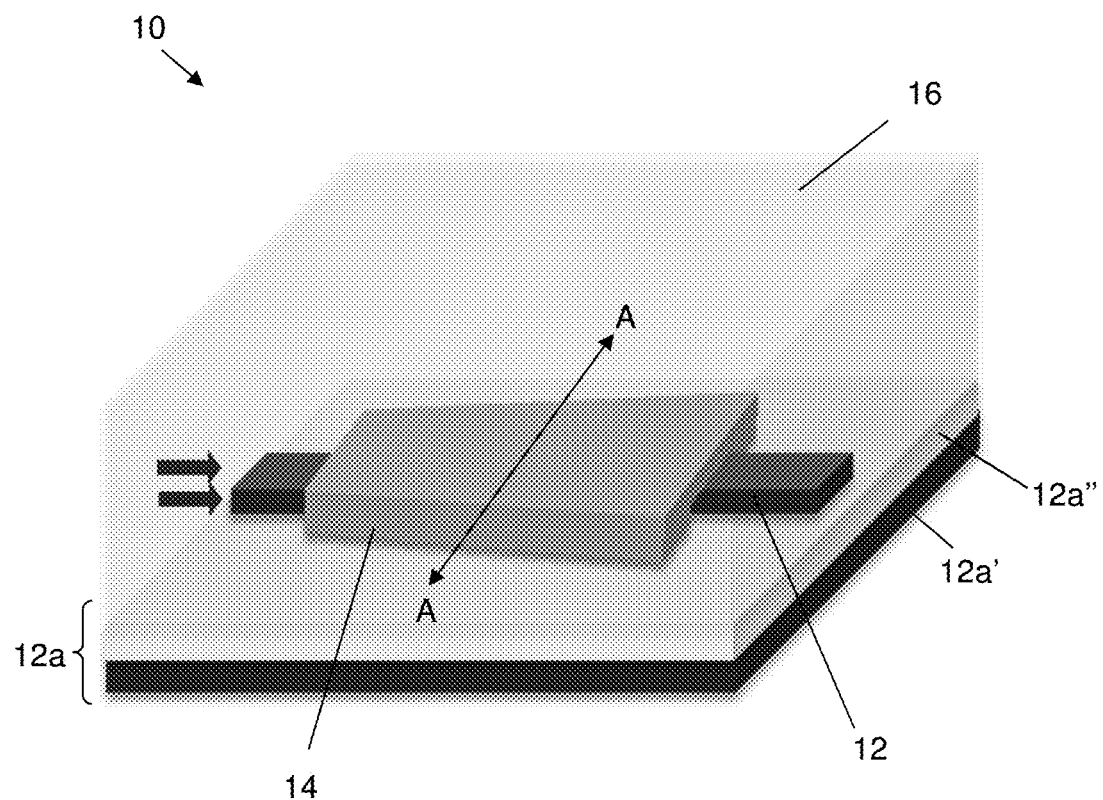
FIG. 1A shows a perspective view of a waveguide absorber, amongst other features, in accordance with aspects of the present disclosure.
Figure 1B:
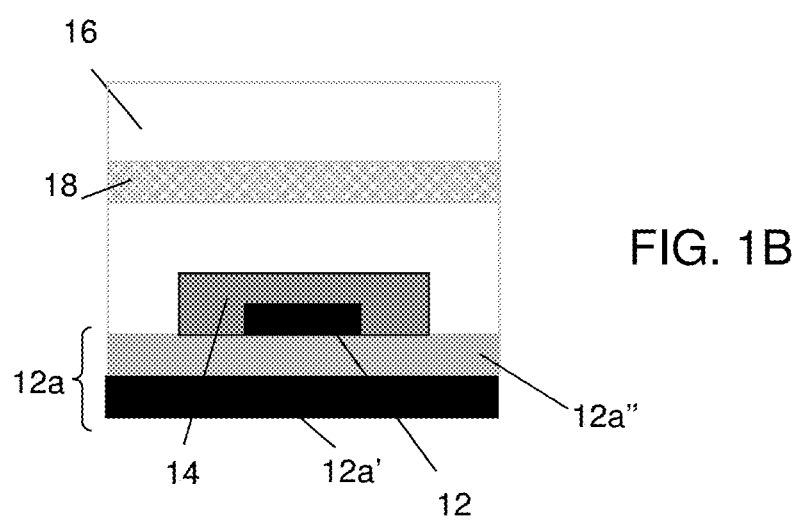
FIG. 1B shows a cross-sectional view of the waveguide absorber of FIG. 1A, along line A-A.

FIG. 1A shows a perspective view of a waveguide absorber, amongst other features, in accordance with aspects of the present disclosure; whereas, FIG. 1B shows a cross-sectional view of the waveguide absorber of FIG. 1A along line A-A. In particular, the structure 10 shown in FIGS. 1A and 1B includes one or more photonics components (e.g., waveguide structures) 12 coated with waveguide absorber material, e.g., waveguide absorber 14. In embodiments, the photonics component 12 can be representative of one or more photonics waveguide component composed of semiconductor material including, e.g., Si or SiN. The photonics component 12 can also be composed of other material systems, e.g., III-V, SiON, AlN, etc.

In embodiments, the Si material can be, for example, silicon-on-insulator technologies; whereas, the SiN can be fully or partially etched material on an oxide material. In the Si implementation shown in FIGS. 1A and 1B, for example, the photonics component 12 can be patterned directly from Si (or other semiconductor material) of the silicon-on-insulator technologies 12a using conventional CMOS fabrication processes as discussed herein, including a thinning of the material. In embodiments, the silicon-on-insulator technologies 12a includes a wafer, e.g., Si wafer 12a' and a buried oxide layer 12a", with the Si photonics component 12 directly patterned on the buried oxide layer 12a".

As further shown in FIGS. 1A and 1B, the photonics component 12 and waveguide absorber 14 can be integrated into a semiconductor monolithic structure with the photonics component 12 and waveguide absorber 14 buried or embedded in an insulator material 16, with an optional nitride layer 18, e.g., SiN, above the photonics component 12 as shown in FIG. 1B. The optional nitride layer 18, e.g., SiN, will be embedded within the insulator material 16, remote from and above the photonics component 12. The arrows are representative of the polarization of the input light, i.e., transverse-electric (TE) mode and transverse-magnetic (TM) mode, Still referring to FIGS. 1A and 1B, the waveguide absorber 14 can be composed of vanadate or other materials with similar material properties. For example, the waveguide absorber 14 can be $CaVO_3$ or $SrVO_3$, etc. It has been found after extensive experimentation that vanadates ($CaVO_3$, $SrVO_3$, etc.) demonstrate good transparent conducting (as with oxides) due to their opto-electronic properties. Moreover, vanadates demonstrate strong guiding properties and strong confinement that is difficult to achieve with existing materials currently integrated into photonics devices, e.g., Ge based absorbers. In further implementations, the waveguide absorber 14 can be other materials having permittivity with a real part in a range of about negative twenty (−20) to about positive twenty (+20), and an imaginary part in a range of zero (0) to about fifteen (15) (e.g., permittivity (−20~20; 0~15).

The waveguide absorber 14, e.g., vanadate, can be deposited directly on the photonics component 12 using chemical vapor deposition (CVD) or hybrid molecular beam epitaxy, pulsed laser deposition, pulsed electron evaporation, atomic layer deposition (ALD), etc., followed by a patterning/etching process to define the shape, e.g., taper, of the waveguide absorber 14. Typical growth temperature is around 350° C.-500° C. The thickness of the absorber material can be, e.g., 0.003~0.5*λ, where λ is the operating wavelength. The device length can be about 5 μm (compared to tens to hundreds of microns using current processes); although other dimensions are contemplated herein.

Following the deposition process, the waveguide absorber 14 can be patterned into different configurations (shapes) as shown in FIGS. 6A-6E. The patterning of the waveguide absorber 14 (and waveguide structure 12) can be performed by conventional lithography and etching processes, known to those of skill in the art. For example, a resist formed over the material of the waveguide absorber 14 is exposed to energy (light) to form a pattern (opening). An etching process with a selective chemistry, e.g., reactive ion etching (RIE), will be used to etch or pattern the material of the waveguide absorber 14 into the many different shapes contemplated herein. The resist can be removed by a conventional oxygen ashing process or other known stripants.

Table 1 below shows improved performance of a photonics device, e.g., waveguide structure, implementing the absorbers shown and described in the present disclosure. More specifically, Table 1 shows a comparison of a photonics device, e.g., waveguide structure, implementing the waveguide absorber shown in FIGS. 1A and 1B to that of a Ge type absorber (where the Ge is grown directly on partially etched Si) for both TE and TM modes.

TABLE 1

|  | Ge Absorber (TE) | Ge Absorber (TM) | Vanadate Absorber (TE) | Vanadate Absorber (TM) |
| --- | --- | --- | --- | --- |
| Back Reflection (dB) | −18.7 dB | −30 dB | −56 dB | −31 dB |
| Insertion loss/attenuation (dB) | −4.7 dB | −3.1 dB | −36 dB | −35 dB |

Figure 2A:
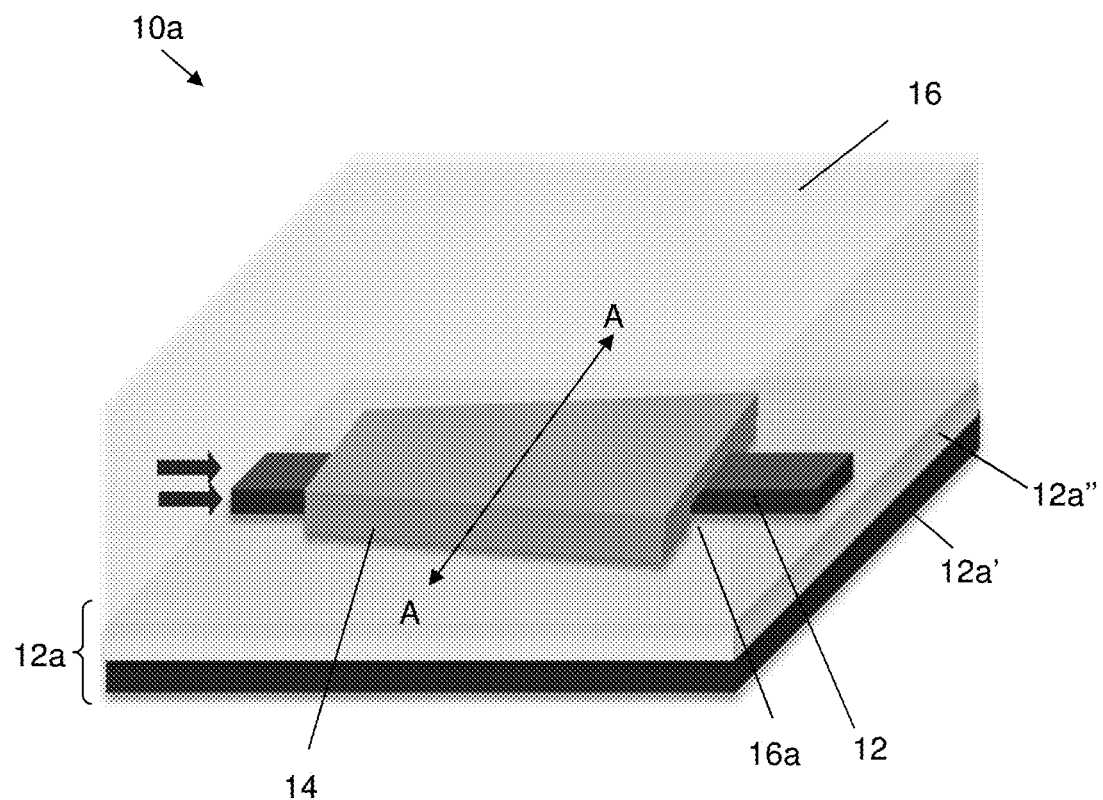
FIG. 2A shows a perspective view of a waveguide absorber, amongst other features, in accordance with additional aspects of the present disclosure.
Figure 2B:
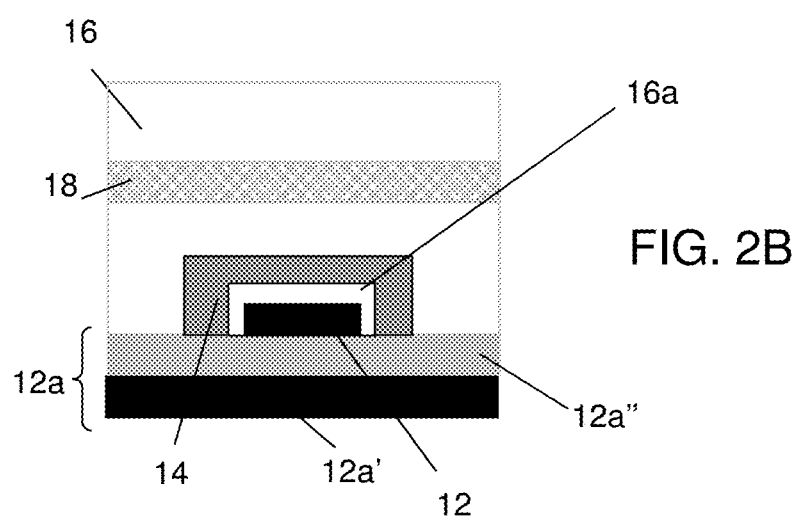
FIG. 2B shows a cross-sectional view of the waveguide absorber of FIG. 2A, along line A-A.

FIG. 2A shows a perspective view of a waveguide absorber, amongst other features, in accordance with additional aspects of the present disclosure; whereas, FIG. 2B shows a cross-sectional view of the waveguide absorber of FIG. 2A along line A-A. In particular, the structure 10a shown in FIGS. 2A and 2B includes a buffer layer 16a separating the photonics component (e.g., waveguide structure) 12 from the waveguide absorber 14. In embodiments, the buffer layer 16a can be an oxide material deposited and patterned directly over the photonics component 12 to ensure that the photonics component 12 is fully embedded or surrounded by the buffer layer 16a.

The remaining features of the structure 10a are similar to that already described with respect to the structure 10 shown in FIGS. 1A and 1B. For example, the photonics component 12 can be representative of one or more photonic waveguide components composed of semiconductor material including, e.g., Si or SiN or other material systems, e.g., III-V, SiON, AlN, etc. Moreover, the waveguide absorber 14 can be integrated into a semiconductor monolithic structure with the photonics component 12, and which is provided in different shapes and composed of vanadate or other materials having permittivity with a real part in a range of about negative twenty (−20) to about positive twenty (+20), and an imaginary part in a range of zero (0) to about fifteen (15) (e.g., permittivity (−20~20; 0~15). In this implementation, though, the waveguide absorber 14 is deposited directly over the buffer layer 16a and patterned accordingly.

Figure 3A:
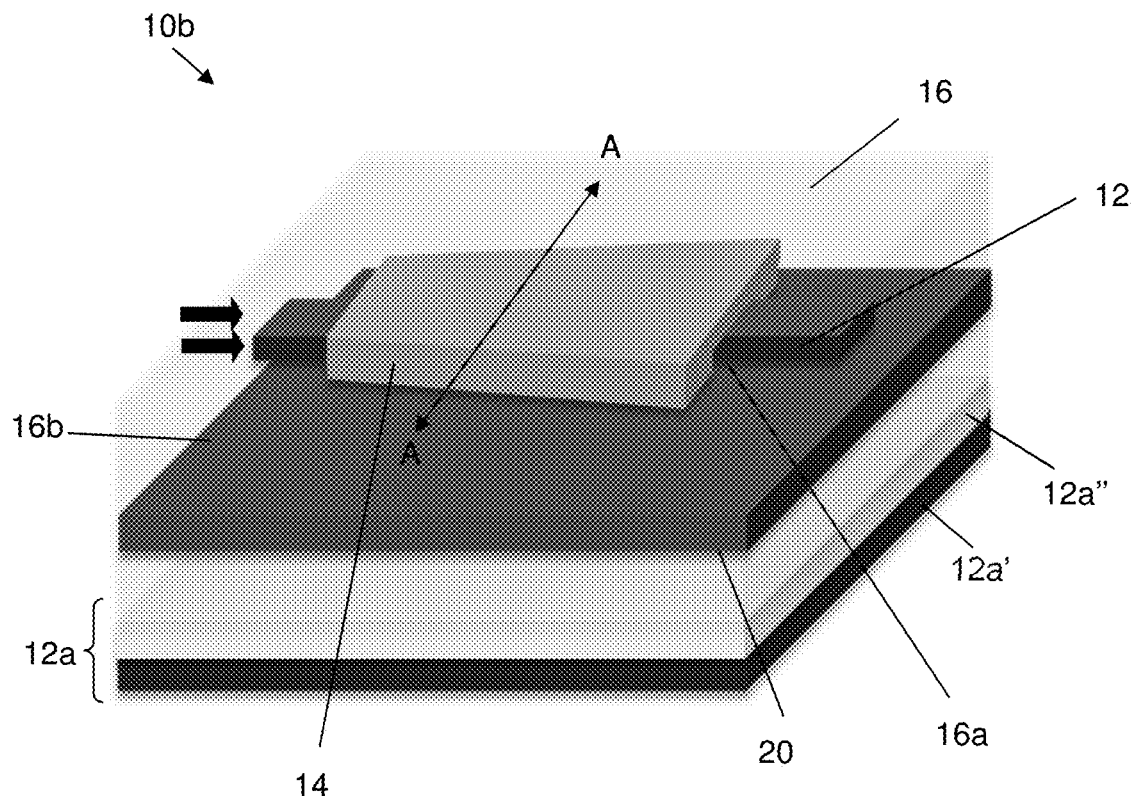
FIG. 3A shows a perspective view of a waveguide absorber, amongst other features, in accordance with additional aspects of the present disclosure.
Figure 3B:
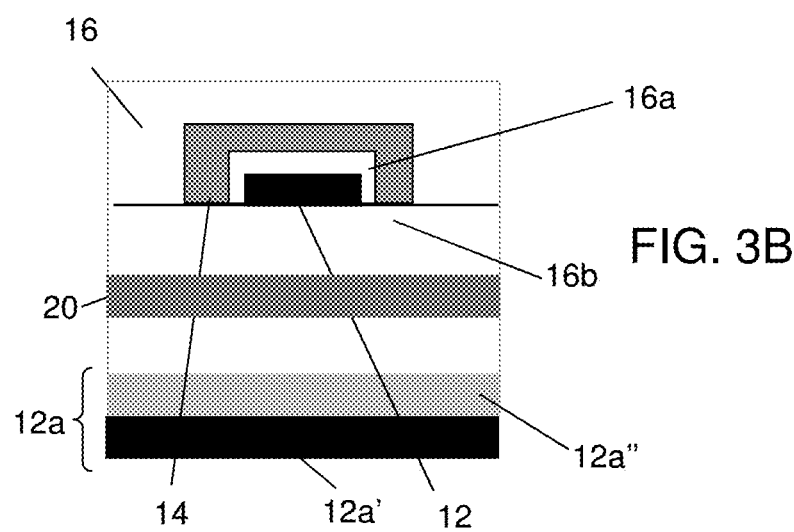
FIG. 3B shows a cross-sectional view of the waveguide absorber of FIG. 3A, along line A-A.

FIG. 3A shows a perspective view of a waveguide absorber, amongst other features, in accordance with additional aspects of the present disclosure; whereas, FIG. 3B shows a cross-sectional view of the waveguide absorber of FIG. 3A along line A-A. In particular, the structure 10b shown in FIGS. 3A and 3B includes a waveguide structure 12 composed of SiN with an optional buffer layer 16a separating the photonics component (e.g., waveguide structure) 12 from the waveguide absorber 14. As should be understood, though, the waveguide structure 12 and the waveguide absorber 14 can be a monolithic integration without any intervening layers as shown in FIGS. 1A and 1B.

In FIGS. 3A and 3B, the photonics component 12 and waveguide absorber 14 are formed, i.e., deposited and patterned, directly on an insulator layer (e.g., $SiO_2$) 16b. In addition, an SiN or other barrier material 20 is provided between the waveguide structure 12 and the buried oxide layer 12a'', embedded within the insulator material 16, 16b. As in each of the different embodiments, the waveguide absorber 14 can be provided in different shapes and composed of vanadate or other materials having permittivity with a real part in a range of about negative twenty (−20) to about positive twenty (+20), and an imaginary part in a range of zero (0) to about fifteen (15) (e.g., permittivity (−20~20; 0~15).

Figure 4A:
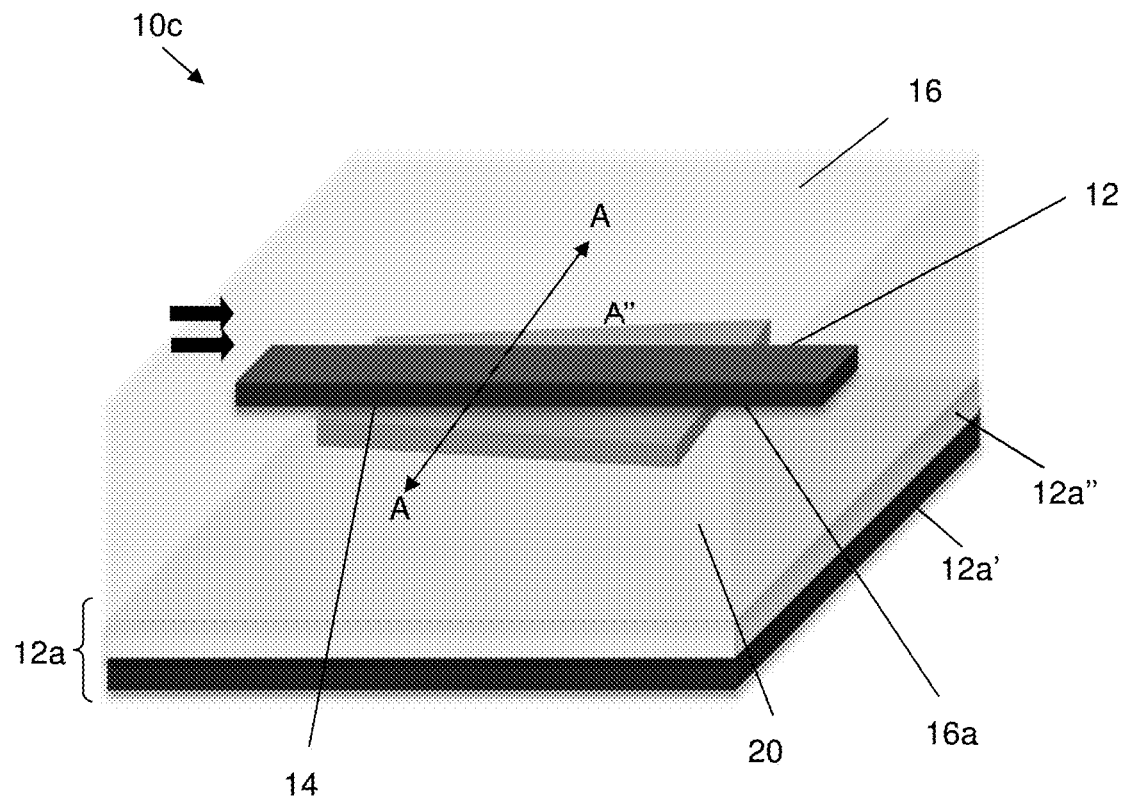
FIG. 4A shows a perspective view of a waveguide absorber, amongst other features, in accordance with additional aspects of the present disclosure.
Figure 4B:
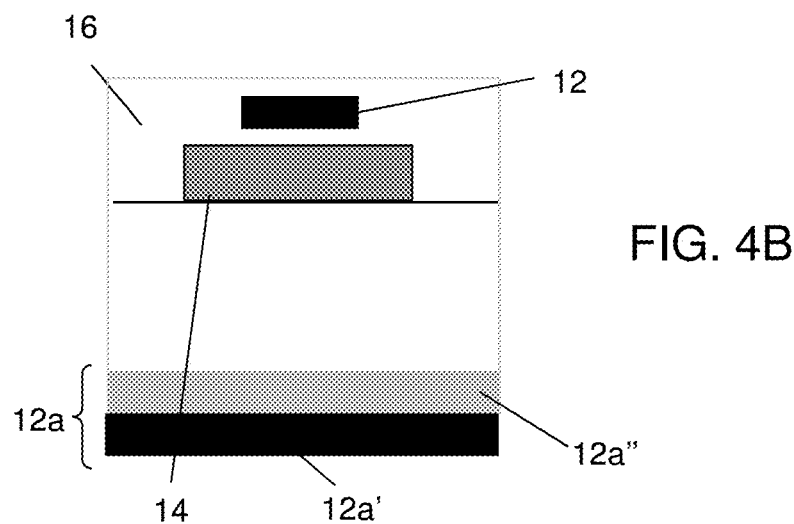
FIG. 4B shows a cross-sectional view of the waveguide absorber of FIG. 4A, along line A-A.

FIG. 4A shows a perspective view of a waveguide absorber, amongst other features, in accordance with additional aspects of the present disclosure; whereas, FIG. 4B shows a cross-sectional view of the waveguide absorber of FIG. 4A along line A-A. In particular, the structure 10c shown in FIGS. 4A and 4B includes a photonics component (e.g., waveguide structure) 12 composed of SiN located above the waveguide absorber 14. In embodiments, the photonics component 12 and waveguide absorber 14 are fabricated into the semiconductor monolithic structure with the insulator layer 16 separating the photonics component (e.g., waveguide structure) 12 and the waveguide absorber 14. Also, the waveguide absorber 14 is an intervening layer between the photonics component (e.g., waveguide structure) 12 and the insulator layer (buried oxide) 12a'' or semiconductor material of SOI technologies 12a.

The photonics component (e.g., waveguide structure) 12 and waveguide absorber 14 are formed, i.e., deposited and patterned, within the insulator layer (e.g., $SiO_2$) 16. As in each of the embodiments, the waveguide absorber 14 can be provided in different shapes and composed of vanadate or other materials having permittivity with a real part in a range of about negative twenty (−20) to about positive twenty (+20), and an imaginary part in a range of zero (0) to about fifteen (15) (e.g., permittivity (−20~20; 0~15).

Figure 5:
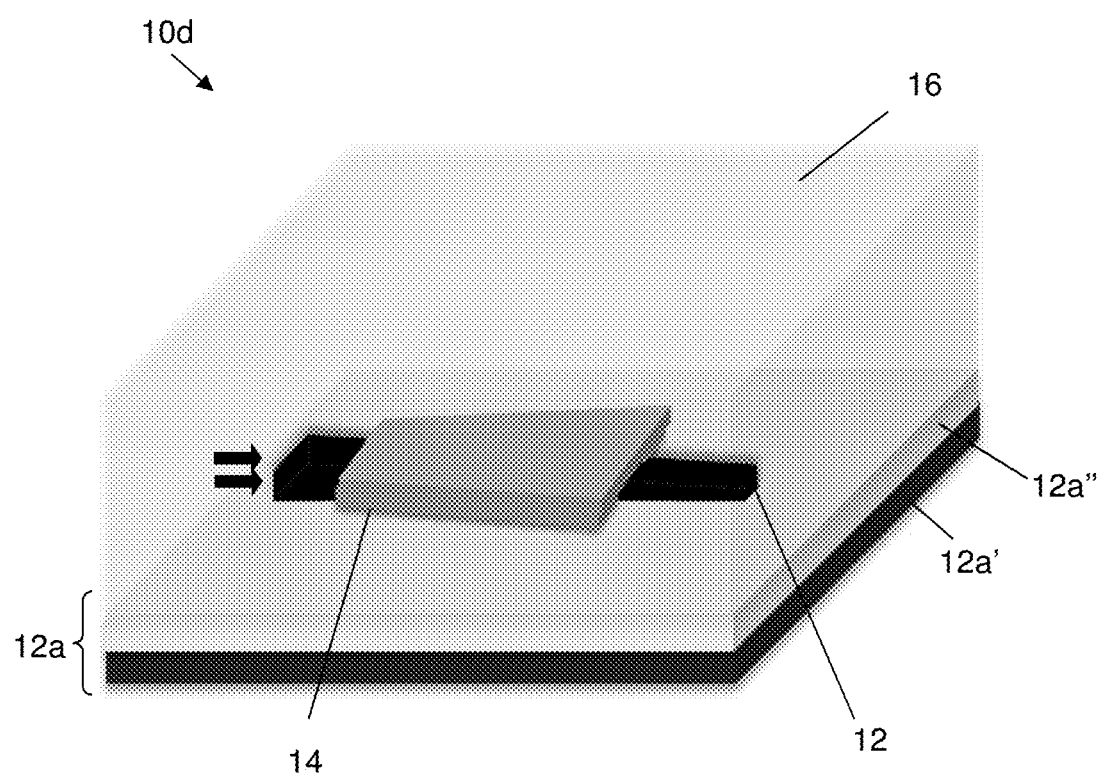
FIG. 5 shows a perspective view of a waveguide absorber, amongst other features, in accordance with additional aspects of the present disclosure.

FIG. 5 shows a perspective view of a waveguide absorber, amongst other features, in accordance with additional aspects of the present disclosure. In particular, the structure 10d shown in FIG. 5 includes a tapered photonics component (e.g., waveguide structure) 12 composed of Si or SiN located below the waveguide absorber 14. In embodiments, the tapered photonics component 12 narrows along the propagation direction. The waveguide absorber 14, on the other hand, can be tapered such that it widens along the propagation direction. In should be understood that any combination of tapered and/or straight photonics component 12 and waveguide absorber 14 are contemplated herein, with or without an insulator layer separating the photonics component (e.g., waveguide structure) 12 and the waveguide absorber 14. The waveguide absorber 14 can be composed of vanadate or other materials having permittivity with a real part in a range of about negative twenty (−20) to about positive twenty (+20), and an imaginary part in a range of zero (0) to about fifteen (15) (e.g., permittivity (−20~20; 0~15).

Figure 6A:
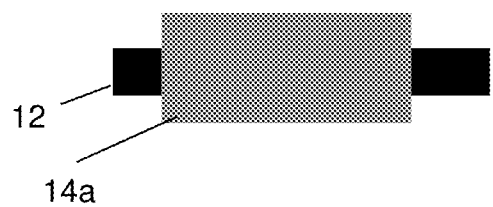
FIGS. 6A-6E show different, illustrative shapes of the waveguide absorber in accordance with aspects of the present disclosure.
Figure 6B:
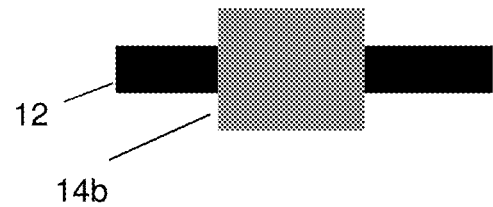
Figure 6C:
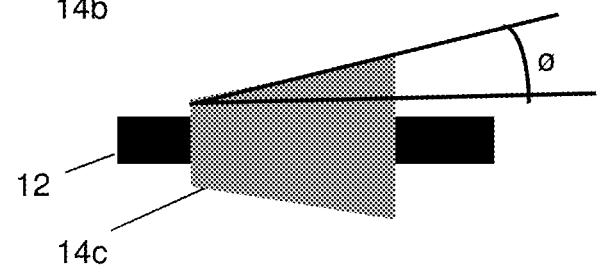
Figure 6D:
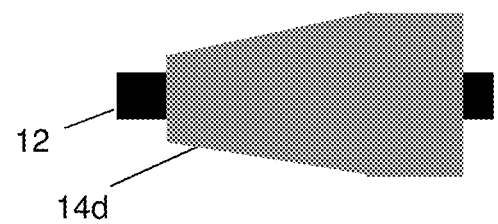
Figure 6E:
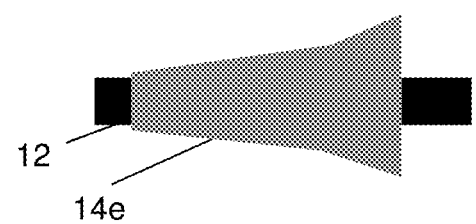

FIGS. 6A-6E show different, illustrative shapes (configurations) of the waveguide absorber, which can be implemented in any of the different aspects of the present disclosure as shown in FIGS. 1A-4B. For example, in FIG. 6A, the absorber 14a is rectangular (with straight sidewalls). In FIG. 6B, the absorber 14b is square (with straight sidewalls). In FIG. 6C, the absorber 14c has tapered sidewalls. In this embodiment, the taper can have an angle of ø, which ranges from about 0° to 45°; although other dimensions are contemplated herein. In FIG. 6D, the absorber 14d has a single taper with a straight section. In FIG. 6E, the absorber 14e has a composite taper, e.g., two different angles of its sidewalls.

Figure 7A:
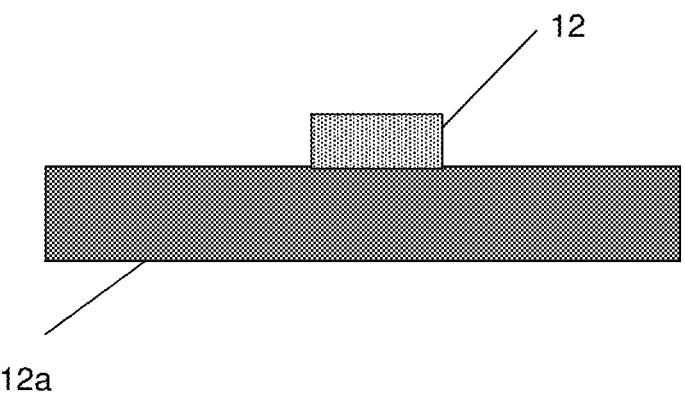
FIGS. 7A-7C show exemplary fabrication processes of the waveguide absorber in accordance with aspects of the present disclosure.
Figure 7B:
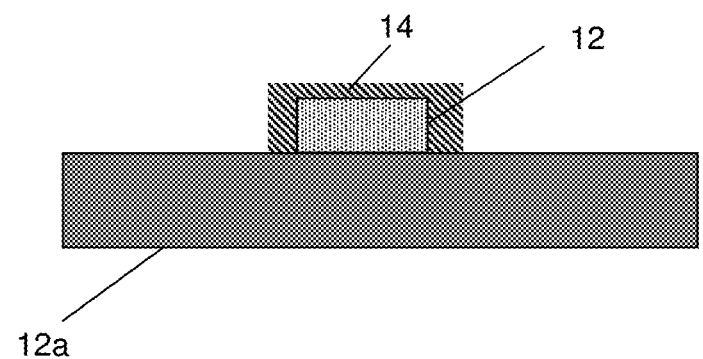
Figure 7C:
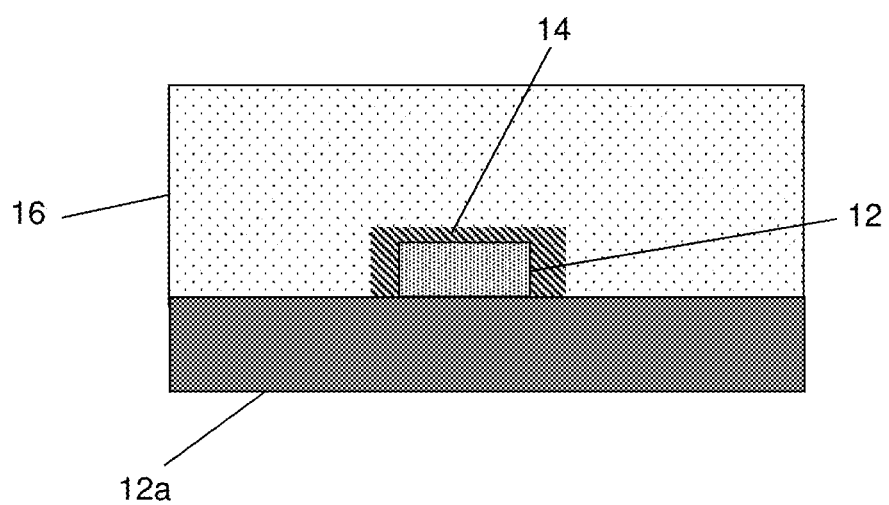

FIGS. 7A-7C show exemplary fabrication processes of the waveguide absorber in accordance with aspects of the present disclosure. In particular, FIG. 7A shows a starting structure including a photonics component 12 fabricated on the SOI technology 12a. In this example, the photonics component 12 is fabricated from Si material and, more particularly, semiconductor-on-insulator (SOI) material by using conventional lithography and etching processes. For example, a resist formed over the semiconductor material is exposed to energy (light) to form a pattern (opening). An etching process with a selective chemistry, e.g., RIE, will be used to pattern the semiconductor material to form one or more photonics component 12. The patterned one or more photonics components can include a tapered coupler, or can be of any shape and/dimension as described with respect to the absorber shown in FIGS. 6A-6E. The resist can be removed by a conventional oxygen ashing process or other known stripants.

It should be understood by those of skill in the art that the lithography and etching processes can be performed on other materials, e.g., SiN material, for forming the one or more photonics components 12. In this implementation, an insulator material will be deposited over the SOI or other material, followed by deposition of the SiN material. The SiN material can then be patterned to form the one or more photonics components 12.

As shown in FIG. 7B, following the resist removal, an absorber material is deposited over the one or more photonics components 12. The absorber material can be vanadate or other materials described herein. Thereafter, the absorber material undergoes a patterning process as described above to fabricate the waveguide absorber 14. In FIG. 7C, additional insulator material 16 is deposited by conventional deposition processes, e.g., chemical vapor deposition, over the waveguide absorber 14.

The waveguide structures described herein can be utilized in system on chip (SoC) technology. It should be understood by those of skill in the art that SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also commonly used in embedded systems and the Internet of Things.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
   a photonics component over an underlying substrate; and
   a vanadate waveguide absorber contacting the underlying substrate and surrounding the photonics component.

2. The structure of claim 1, wherein the vanadate waveguide absorber is $CaVO_3$ or $SrVO_3$, which coats the photonics component on sides and a top surface to provide an integrated monolithic structure.

3. The structure of claim 1, wherein the vanadate waveguide absorber has a permittivity with a real part in a range of about negative twenty (−20) to about positive twenty (+20), and an imaginary part in a range of zero (0) to about fifteen (15).

4. The structure of claim 1, wherein the photonics component is composed of Si of SOI technology or SiN and the vanadate waveguide absorber contacts sides and a top surface of the photonics component providing an integrated monolithic structure.

5. The structure of claim 1, further comprising a buffer layer separating the photonics component from the vanadate waveguide absorber, wherein the buffer layer fully embeds the photonics component by contacting sides and a top surface of the photonics component, and the vanadate waveguide absorber surrounds both the buffer layer and the photonics component.

6. The structure of claim 5, further comprising a nitride layer embedded in an insulator layer, above the vanadate waveguide absorber.

7. The structure of claim 1, wherein the photonics component is composed SiN and a nitride layer is embedded in an insulator layer.

8. The structure of claim 1, wherein the photonics component is composed of SiN.

9. The structure of claim 1, wherein the vanadate waveguide absorber is tapered and directly contacts sides and a top surface of the photonics component.

10. The structure of claim 1, wherein the vanadate waveguide absorber includes a composite taper of different angles and directly contacts sides and a top surface of the photonics component.

11. A structure comprising:
    a photonics component; and
    a waveguide absorber integrated with and surrounding the photonics component, the waveguide absorber comprises a permittivity with a real part in a range of about negative twenty (−20) to about positive twenty (+20), and an imaginary part in a range of zero (0) to about fifteen (15).

12. The structure of claim 11, wherein the waveguide absorber is composed of $CaVO_3$ or $SrVO_3$, which directly contacts sides and a top surface of the photonics component to form a monolithic structure.

13. The structure of claim 11, wherein the photonics component is composed of Si of SOI technology, SiN, III-V materials, SiON, AN or polymer and the waveguide absorber directly contacts sides and a top surface of the photonics component to form a monolithic structure.

14. The structure of claim 11, further comprising a buffer layer separating the photonics component from the waveguide absorber, wherein the buffer layer fully embeds the photonics components by contacting sides and a top surface of the photonics component, and the waveguide absorber surrounds both the buffer layer and the photonics component and contacts an insulator material which is under the photonics component.

15. The structure of claim 14, further comprising a nitride layer embedded in an insulator layer, above the waveguide absorber.

16. The structure of claim 11, wherein the photonics component is composed SiN, the waveguide absorber coats the photonics component, and a nitride layer is embedded in an insulator layer which separates the waveguide absorber and the photonics component from an underlying substrate.

17. The structure of claim 11, wherein the photonics component is composed SiN and the waveguide absorber is under the photonics component to separate the photonics component from an underlying substrate, and the waveguide absorber directly contacts the underlying substrate.

18. The structure of claim 11, wherein the vanadate waveguide absorber and the photonics component can be any combination of straight and tapered.

19. A structure, comprising:
    a waveguide structure composed of semiconductor material;
    a waveguide absorber coating the waveguide structure and integrated into a monolithic device with the waveguide structure, the waveguide absorber comprising $CaVO_3$ or $SrVO_3$; and
    an insulator material surrounding the waveguide structure and the waveguide absorber.

20. The structure of claim 19, wherein the waveguide absorber directly contacts side surfaces and a top surface of the waveguide structure, and further contacts an underlying insulator layer in which the waveguide structure also contacts.

* * * * *

UNITED STATES PATENT AND TRADEMARK OFFICE
CERTIFICATE OF CORRECTION

PATENT NO. : 11,092,743 B2
APPLICATION NO. : 16/749363
DATED : August 17, 2021
INVENTOR(S) : Yusheng Bian et al.

It is certified that error appears in the above-identified patent and that said Letters Patent is hereby corrected as shown below:

In the Claims

In Claim 13, Line 21 at Column 8, change "AN" to "AIN"".

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*